Jan. 15, 1935.    A. I. FERRIER    1,987,673
PRESSURE GAUGE
Filed July 17, 1929    2 Sheets-Sheet 1
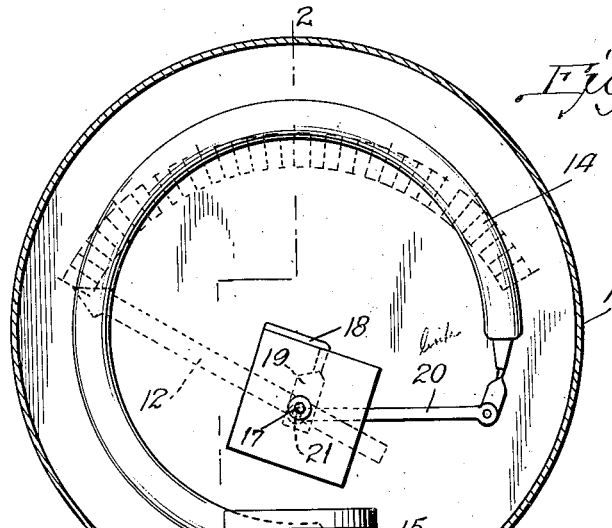
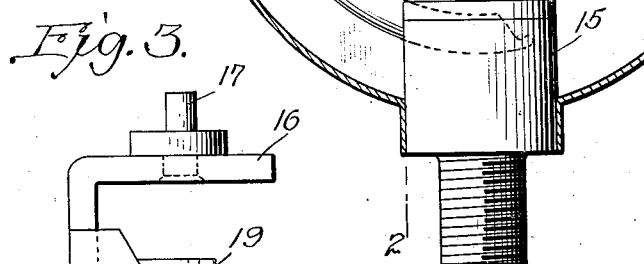
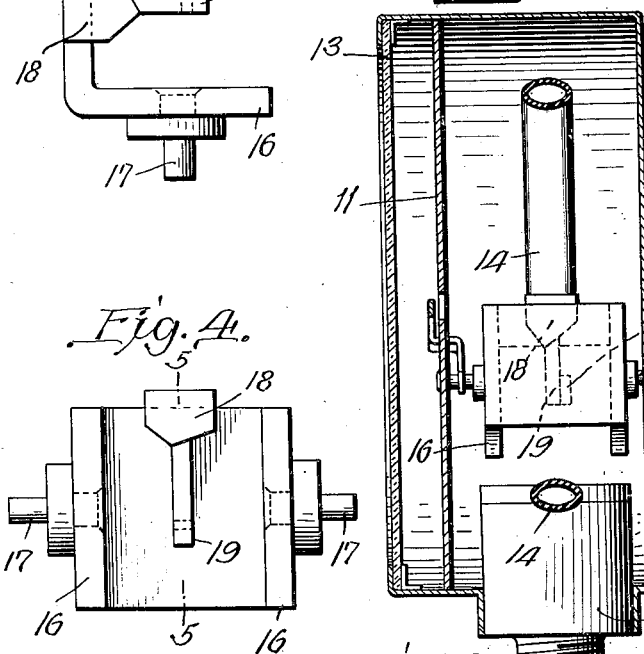
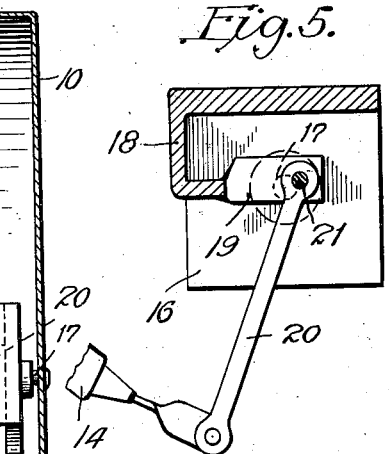
Inventor
Alexander I. Ferrier
By Ralph S. Turoff
Attorney.

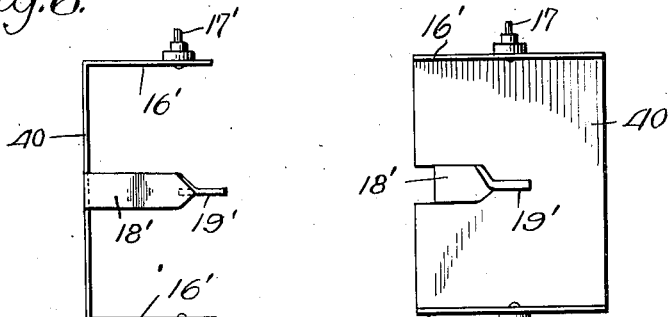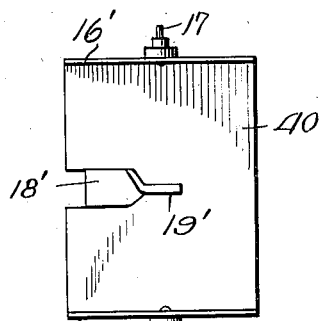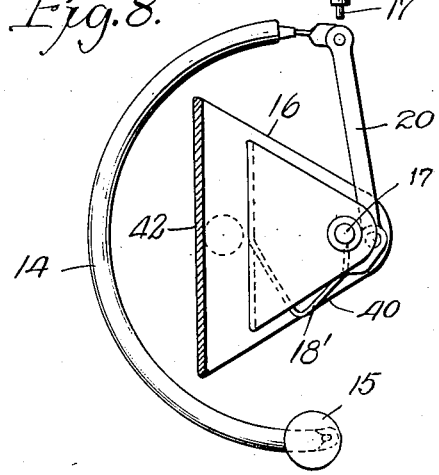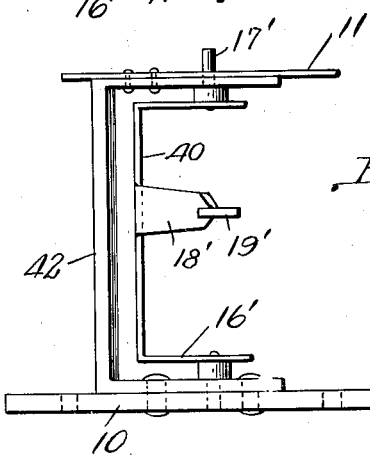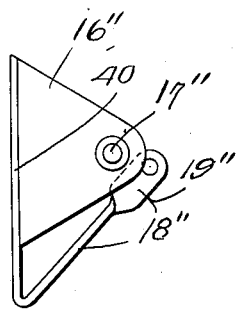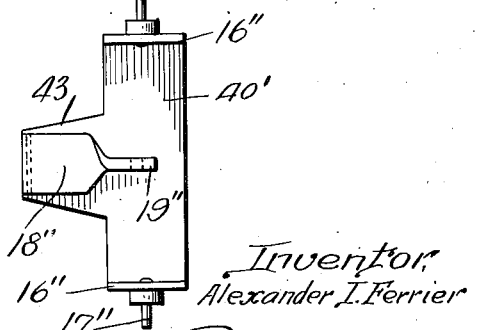

Patented Jan. 15, 1935

1,987,673

UNITED STATES PATENT OFFICE 1,987,673

PRESSURE GAUGE

Alexander I. Ferrier, Detroit, Mich., assignor, by mesne assignments, to General Motors Corporation, Detroit, Mich., a corporation of Delaware Application July 17, 1929, Serial No. 378,935

6 Claims. (Cl. 73—109)

This invention relates to pressure gauges, and especially to that type of pressure gauge embodying or employing a Bourdon tube therein. More particularly the invention relates to a calibrating device for connecting the free end of the tube and the pointer or indicator of the gauge.

A major purpose of the present invention is to simplify and improve the general construction of devices of this character.

A further object of the invention is to provide in a pressure gauge a lever and link connection between a Bourdon tube and an indicator or pointer so arranged that the effective leverage of the device may be readily varied so that the movement of the indicator over the dial may be calibrated to make the dial divisions agree with equal pressure increments.

It is a still further object of the present invention to provide a device of the class set forth which will be simple and convenient of manufacture and assembly; which will be efficient in operation; which will have a minimum number of parts therein; and which will be both strong and durable. Further objects of the invention will be hereinafter more fully set forth.

The accompanying drawings illustrate several forms of pressure gauge embodying the present invention which will be described in detail to enable others to understand and use the same, but the invention is not considered restricted to the specific construction shown in the drawings and reference is therefore had to the claims for summaries of the essentials of the invention and of the novel features of construction and of the novel combinations of parts for all of which protection is desired.

In the drawings:

Figure 1 is a view of a pressure gauge of the class set forth, the rear wall thereof being broken away to illustrate the interior construction and assembly.

Figure 2 is a sectional view taken on the line 2—2 of Figure 1.

Figure 3 is an enlarged detail plan view of one form of calibrating stem and lever connection constructed in accordance with the present invention.

Figure 4 is a front view of the form of the invention illustrated in Figure 3.

Figure 5 is a detail sectional view taken on the line 5—5 of Figure 4 illustrating the connection between the stem and the Bourdon tube.

Figure 6 is an enlarged detail plan view of a modified form of calibrating stem and lever connection embodying the present invention.

Figure 7 is a view in front elevation of the form of the invention illustrated in Figure 6.

Figure 8 is an end view of the stem illustrating the connection thereof with the Bourdon tube.

Figure 9 is a plan view illustrating the mounting of this form of the invention within the gauge casing proper.

Figure 10 is a view in end elevation illustrating a slightly further modified form of the invention.

Figure 11 is a view in front elevation of the form of the invention illustrated in Figure 10.

There has been illustrated in the drawings, conventionally, the usual type of pressure gauge including a casing 10, a dial 11 over which travels an indicator or pointer 12, and a glass or glazed front covering 13 protecting the dial and indicator. A Bourdon tube 14 is mounted within the casing and has an end thereof fitted to a nipple or the like 15 by which the tube is connected to a line of pipe or the like containing fluid, the pressure of which is to be indicated.

Obviously the gauge, and the tube therein and other associated parts may be of any desired construction as is well known in the art and may be of any size and capacity to meet the particular requirements desired, and while the gauge as illustrated is especially designed to indicate the air pressure as within pneumatic tires or the like, this showing is merely illustrative and not in any way limitive.

In the form of the invention illustrated more particularly in Figures 1 through 5 of the drawings inclusive, there is provided a calibrating device or stem comprising a U-shaped body having parallel arms 16 to which are attached by any suitable means such as welding, riveting, brazing or the like, a pair of stub shafts 17 by which the stem is journalled in the casing 10, one of these shafts 17 projecting through the dial and being designed to carry the indicator or pointer thereon. Extending from the middle portion of the body is a bendable arm or the like 18 having the extremity 19 thereof bent to extend between the arms of the body and also twisted to lie in a plane parallel to the said arms. A link 20 is pivotally connected to this arm end 19, the opposed extremity of the link being adapted for pivotal connection or engagement with the free extremity of the Bourdon tube 14. It will be noted that the pivotal connection 21 between the link 20 and the arm 18 is offset with respect to the center of the stub shafts 17 by which the member 16 is mounted or journalled; by properly bending the said arm 18 the distance from the axis of the shafts 17 to the pivotal center 21 may be varied so that the ratio of movement between the end of the Bourdon tube and indicator may be varied to properly calibrate the gauge.

In the form of the invention illustrated in Figures 6 to 9 inclusive, of the drawings, the calibrating stem is substantially identical with the first described form, the differences being in the construction and shape of the parts, this form of the invention illustrating the body portion stamped from sheet metal. In this modification the stem comprises a U-shaped stamping 40, the base of which is of uniform width throughout as best shown in Figure 7. The arms 16', however, are triangular in shape, tapering from the base, and carry a pair of stub shafts 17' at the upper extremity. Extending from the middle portion of the base and integral therewith is a bendable arm 18' having the extremity 19' thereof bent to extend between the arms of the stem and also twisted to lie in a plane parallel to the arms. In this form, a U-shaped bracing member 42 is secured to the casing 10 and to the dial 11 by rivets through the arms thereof to rigidify the structure. Bearings are formed for the stud shafts in the arms of the bracing member, and in its assembled position the bracing member substantially surrounds the stem. As in the previous case, the end of the bendable arm, as 19', is connected to a link 20 which is actuated by the Bourdon tube. Figures 10 and 11 show a slightly modified form of the stem stamping that may be used in the above assembly. The stamping 40' has a base that is narrower than in Figure 7, and has a projecting portion 43 which is integral with the bendable arm 18'' carrying the end 19'' for connection to the link 20. The arms 16'' are narrower, of course, but still triangular and carry similar stub shafts 17''. This calibrating stem may, of course, be used interchangeably in the supporting structure with the stem 40.

It will be noted that the calibration of all of the herein illustrated forms of the invention is particularly simple and convenient, comprising merely the proper adjustment of the center of the pivotal connection of the link 20 with the body proper with respect to the center of the stub shafts by which the said body is journalled. There has thus been provided several forms of a particularly efficient device of the class described and for the purposes specified.

It is obvious that many minor changes may be made in the form and construction of the invention without departing from the material principles or scope thereof. It is not therefore desired to confine the invention to any one or more of the specific forms illustrated, but to include all such and other forms of devices of the class described including the inventive idea embodied herein.

The invention having thus been described what is claimed is:

1. In a pressure gauge having a Bourdon tube, a calibrating stem body having spaced parallel side members, stub shafts extending outwardly from said side members, said stub shafts being in axial alignment, said body member having a connecting member joining said side members, a bendable pivot member carried by said connecting member, a pivot carried thereby, said connecting member being spaced from the axis of the stub shafts whereby said pivot may be adjusted to a position where its axis is substantially in alignment with the axis of said stub shafts, and a link connecting said pivot to said Bourdon tube.

2. In a pressure gauge, a casing having a rear wall and a dial supported therein in spaced relation to the rear wall, a calibrating stem body having a pair of stub shafts, a substantially U-shaped bracing member secured to said rear wall and to said dial, and partially surrounding said calibrating stem body, said stub shafts being journaled in said member.

3. In a gauge, a Bourdon tube permanently mounted in the gauge, a substantially U-shaped calibrating body pivotally mounted in the gage, an adjustable arm carried by said body, said arm being bendable to adjust the gauge, a pointer secured to said body and movable therewith, and a link connecting the Bourdon tube to the arm.

4. In a gauge, a Bourdon tube permanently mounted in the gauge, a substantially U-shaped calibrating body pivotally mounted in the gage, an adjustable arm carried by said body and integral with the base of the U, said arm being bendable to adjust the gauge, a pointer secured to said body and movable therewith, and a link connecting the Bourdon tube to the arm.

5. In a pressure gauge including a casing, a dial, and an indicator, a nipple on said casing, a Bourdon tube within the casing connected to said nipple, a substantially U-shaped calibrating stem body having a pair of oppositely extending stub shafts rigid with the legs of the body journaled within the casing, an adjustable bendable arm carried by the said body, a link connecting the arm to the free end of the Bourdon tube whereby adjustment of the arm will vary the pivotal center of the arm with respect to the center of the stub shafts thus to calibrate the device.

6. In a gauge, a Bourdon tube and a substantially U-shaped calibrating stem body mounted in the gauge, an adjustable bendable arm carried by the said body, a pair of oppositely extending stub shafts rigid with the legs of the body for journalling said body in the gauge, a pointer carried by one of said shafts, and a link connecting the adjustable arm of the Bourdon tube.

ALEXANDER I. FERRIER.